(12) United States Patent
Chaen et al.

(10) Patent No.: US 10,759,364 B2
(45) Date of Patent: Sep. 1, 2020

(54) ELECTRICAL APPARATUS AND ELECTRICAL APPARATUS SYSTEM

(71) Applicant: SUMITOMO WIRING SYSTEMS, LTD., Yokkaichi-shi, Mie (JP)

(72) Inventors: Satoru Chaen, Yokkaichi (JP); Keiichi Ogawa, Yokkaichi (JP); Hiroshi Kojima, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 88 days.

(21) Appl. No.: 16/318,347

(22) PCT Filed: Jul. 18, 2017

(86) PCT No.: PCT/JP2017/025879
§ 371 (c)(1),
(2) Date: Jan. 16, 2019

(87) PCT Pub. No.: WO2018/021086
PCT Pub. Date: Feb. 1, 2018

(65) Prior Publication Data
US 2019/0283694 A1    Sep. 19, 2019

(30) Foreign Application Priority Data
Jul. 29, 2016 (JP) .................. 2016-149839

(51) Int. Cl.
*H02G 3/08*    (2006.01)
*B60R 16/02*   (2006.01)
(Continued)

(52) U.S. Cl.
CPC .......... *B60R 16/0239* (2013.01); *B60R 16/02* (2013.01); *B60R 16/0238* (2013.01);
(Continued)

(58) Field of Classification Search
CPC .......... H02G 3/08; H02G 3/081; H02G 3/086; H02G 3/088; H02G 3/14; H05K 5/00;
(Continued)

(56) References Cited

U.S. PATENT DOCUMENTS 5,531,345 A * 7/1996 Nakamura ............. H02G 3/088
                                                220/3.8
6,545,217 B2 * 4/2003 Sato ...................... H02G 3/088
                                                174/135
(Continued)

FOREIGN PATENT DOCUMENTS

JP    2006-74988 A    3/2006
JP    2010-288371 A   12/2010
(Continued)

OTHER PUBLICATIONS

Oct. 17, 2017 International Search Report issued in International Patent Application PCT/JP2017/025879.

*Primary Examiner* — Angel R Estrada
(74) *Attorney, Agent, or Firm* — Oliff PLC

(57) ABSTRACT

An electrical apparatus includes a circuit structure, a case provided with a bottom panel and a case peripheral wall, and a cover provided with a cover panel and a cover peripheral wall. At least a part of an inner surface of the cover peripheral wall and an outer surface of the case peripheral wall face one another, thereby forming a housing space and
(Continued)

housing the circuit structure within the housing space. A groove is formed in at least one of (i) the entire periphery of the outer surface of the case peripheral wall or (ii) the entire periphery of the inner surface of the cover peripheral wall. This configuration provides a structure that suppresses infiltration of liquid to the inside of the case, and suppresses adhesion of liquid to the circuit structure.

7 Claims, 16 Drawing Sheets

(51) Int. Cl.
  *B60R 16/023* (2006.01)
  *H02G 3/14* (2006.01)
  *H05K 5/02* (2006.01)
(52) U.S. Cl.
  CPC ............. *H02G 3/086* (2013.01); *H02G 3/088* (2013.01); *H02G 3/14* (2013.01); *H05K 5/02* (2013.01)
(58) Field of Classification Search
  CPC .......... H05K 5/02; H05K 5/0217; H05K 5/03; H05K 5/04; H01R 13/46; H01R 13/52; H01R 13/5202; B60R 16/02; B60R 16/0239; B60R 16/0238
  USPC ......... 174/50, 520, 535, 559, 560, 561, 562, 174/480, 481, 500, 504; 220/3.2–3.9, 220/4.02; 439/76.1, 76.2; 361/600, 601, 361/641, 679.01
  See application file for complete search history.

(56) References Cited

U.S. PATENT DOCUMENTS

| | | | | |
|---|---|---|---|---|
| 7,878,357 | B2* | 2/2011 | Yoshida | H02G 3/081 174/50 |
| 8,210,378 | B2* | 7/2012 | Takeuchi | H02G 3/14 174/50.5 |
| 8,785,775 | B2* | 7/2014 | Takeuchi | H02G 3/088 174/67 |
| 8,878,059 | B2* | 11/2014 | Makino | H02G 3/088 174/50 |
| 8,981,219 | B2* | 3/2015 | Makino | H02G 3/088 174/50 |
| 9,038,839 | B2* | 5/2015 | Nakayama | H02G 3/081 174/50 |
| 2012/0073851 | A1 | 3/2012 | Takeuchi et al. | |
| 2012/0132454 | A1 | 5/2012 | Miyamoto et al. | |
| 2015/0016076 | A1 | 1/2015 | Shimizu et al. | |

FOREIGN PATENT DOCUMENTS

| | | |
|---|---|---|
| JP | 2012-115088 A | 6/2012 |
| JP | 2013-176242 A | 9/2013 |
| JP | 2014-086636 A | 5/2014 |
| JP | 2016-127640 A | 7/2016 |

\* cited by examiner

ELECTRICAL APPARATUS AND ELECTRICAL APPARATUS SYSTEM

The technology disclosed in this specification relates to an electrical apparatus and an electrical apparatus system.

BACKGROUND

In the past, an electrical apparatus positioned in water-submerged region of the engine compartment of an automobile has been equipped with a waterproof structure to prevent infiltration of water into the inside of the electrical apparatus (see Patent Reference 1).

Patent Reference 1: JP2006-74988A

SUMMARY

On the other hand, an electrical apparatus positioned inside the vehicle cabin, unlike one positioned in the engine compartment, does not need to have an advanced waterproof structure, but there are fears that fluids will infiltrate from gaps between a case and cover due to the capillary phenomenon, and there are concerns that troubles could arise in the circuit structure.

The technology disclosed in this specification was completed on the basis of the above-described circumstances, and it is an object of the invention to provide an electrical apparatus equipped with a drip-proof structure for suppressing infiltration of a fluid to the inside of the case, and adhesion of the fluid to the circuit structure.

A technology disclosed in this specification is an electrical apparatus comprising: a circuit structure; a case provided with a bottom panel and a case peripheral wall standing erect from a peripheral edge of the bottom panel, the case including a space formed by the bottom panel and the case peripheral wall; and a cover provided with a cover panel and a cover peripheral wall standing erect from a peripheral edge of the cover panel, the cover panel being assembled to the case in a state in which the cover panel covers the space in the case and at least a part of an inner surface of the cover peripheral wall and an outer surface of the case peripheral wall are facing one another, thereby forming a housing space along with the case and housing the circuit structure within the housing space; wherein the electrical apparatus includes: a bottom panel-side region at a position close to the bottom panel, with at least a part of the outer surface of the case peripheral wall and at least a part of the inner surface of the cover peripheral wall facing one another along the entire periphery; a cover panel-side region at a position closer to the cover panel than the bottom panel-side region, with at least a part of the outer surface of the case peripheral wall and at least a part of the inner surface of the cover peripheral wall substantially abutting each other along the entire periphery; and a middle region between the bottom panel-side region and the cover panel-side region; and wherein in the middle region, a groove is formed in at least one of (i) the entire periphery of the outer surface of the case peripheral wall or (ii) the entire periphery of the inner surface of the cover peripheral wall.

When liquid adheres to a tip edge of the cover peripheral wall, there are concerns that the liquid could infiltrate to the inside of the case through the capillary phenomenon from the space where the case peripheral wall and the cover peripheral wall face each other. Hence, in the middle region, by providing a groove in at least one of (i) the entire periphery of the outer surface of the case peripheral wall or (ii) the entire periphery of the inner surface of the cover peripheral wall, liquid that has infiltrated due to the capillary phenomenon can be kept from infiltrating into the cover panel side (cover panel-side region) of the cover beyond the groove.

In addition, by forming this groove in at least one of (i) the entire periphery of the outer surface of the case peripheral wall or (ii) the entire periphery of the inner surface of the cover peripheral wall, liquid that has adhered to the tip edge of the cover peripheral wall from any position, in the circumferential direction, of the electrical apparatus and has infiltrated from the space between the case peripheral wall and the cover peripheral wall in the bottom panel-side region can be kept from infiltrating into the cover panel-side region.

Furthermore, in the middle region, the groove is formed in at least one of (i) the entire periphery of the outer surface of the case peripheral wall or (ii) the entire periphery of the inner surface of the cover peripheral wall, so liquid that has flowed down to the inside of the groove flows down to a section positioned at the very bottom in the direction of gravity. Furthermore, liquid that has flowed down to the bottom-most position is discharged to the outside through the space where the case peripheral wall and the cover peripheral wall face each other in the bottom panel-side region.

The following conditions are preferable as embodiments of the technology disclosed in this specification.

The groove is preferably formed in the outer surface of the case peripheral wall.

By forming the groove on the outer surface of the case peripheral wall, it is possible to more reliably suppress infiltration of liquids into the inside of the case.

In the bottom panel-side region, the direction in which a gap between the inner surface of the cover peripheral wall and the outer surface of the case peripheral wall faces is preferably a horizontal direction or downward in the direction of gravity.

With the above-described configuration, liquid that has flowed down from above has difficulty adhering in the space between the outer surface of the case peripheral wall and the inner surface of the cover peripheral wall. Through this, it is possible to suppress infiltration of liquid to the inside from the space between the outer surface of the case peripheral wall and the inner surface of the cover peripheral wall.

Preferably, the case has a shape in which the outer periphery corners of the bottom panel are chamfered and includes a case-side inclined surface, and the case-side inclined surface is formed along the entire periphery of the corner formed by the bottom panel and the case peripheral wall.

By making the outer surface of the corner formed by the bottom panel and the case peripheral wall the case-side inclined surface, it is possible to cause liquid that has straddled and adhered to the bottom wall of the case to quickly flow down to the outer surface of the bottom panel by the case-side inclined surface. Through this, it is possible to minimize liquid infiltrating into the space between the outer surface of the case peripheral wall and the inner surface of the cover peripheral wall, from the space between the bottom panel and the tip edge of the cover peripheral wall.

Preferably, the tip edge of the cover peripheral wall has an enlarging shape in which the opening becomes larger when moving away from the cover panel, and the inner surface thereof has a cover-side inclined surface that slopes to the outside when moving away from the cover panel, and the cover-side inclined surface is formed along the entire periphery of the cover peripheral wall.

The liquid that has flowed down to the bottom-most position in the direction of gravity along the groove flows down to the tip edge of the cover peripheral wall across the space between the outer surface of the case peripheral wall and the inner surface of the cover peripheral wall. Because the cover-side inclined surface is formed at the tip edge of this cover peripheral wall, the liquid is guided to the bottom in the direction of gravity by the cover-side inclined surface and is quickly discharged from inside the electrical apparatus. In addition, by forming the cover-side inclined surface along the entire periphery, it is possible to more reliably discharge the liquid that has flowed along the groove from any position, in the circumferential direction, of the electrical apparatus.

Preferably, the tip edge of the cover peripheral wall has a protrusion that protrudes beyond the outer surface of the bottom panel of the case.

Because the tip edge of the cover peripheral wall protrudes beyond the bottom panel of the case, liquid that flows down from above to the section positioned below the cover peripheral wall in the direction of gravity is kept from adhering. Through this, it is possible to keep liquid at the boundary between the cover peripheral wall and the bottom wall of the case from adhering, so it is possible to suppress infiltration of liquid into the space between the outer surface of the case peripheral wall and the inner surface of the cover peripheral wall.

Preferably, the facing distance between the outer surface of the case peripheral wall and the inner surface of the cover peripheral wall facing each other in the bottom panel-side region is larger than the facing distance between the outer surface of the case peripheral wall and the inner surface of the cover peripheral wall in the cover panel-side region, and is smaller than the facing distance between the outer surface of the case peripheral wall and the inner surface of the cover peripheral wall in the middle region.

With the above-described configuration, even when liquid has infiltrated from the bottom panel-side region, the facing distance between the outer surface of the case peripheral wall and the inner surface of the cover peripheral wall in the bottom panel-side region is smaller than the facing distance between the outer surface of the case peripheral wall and the inner surface of the cover peripheral wall in the middle region, so by the groove provided in the middle region, it is possible to sufficiently receive liquid. Liquid that has flowed down inside the groove flows down to the section positioned at the very bottom in the direction of gravity, but because the facing distance between the outer surface of the case peripheral wall and the inner surface of the cover peripheral wall in the bottom panel-side region is larger than the facing distance between the outer surface of the case peripheral wall and the inner surface of the cover peripheral wall in the cover panel-side region, the liquid that has flowed down to the bottom-most position of the groove readily flows to the bottom panel-side region from the cover panel-side region, and is discharged to the outside through the space where the outer surface of the case peripheral wall and the inner surface of the cover peripheral wall face each other in the bottom panel-side region.

Preferably, in an electrical apparatus system comprising a plurality of the above-described electrical apparatuses, each of the covers of the plurality of electrical apparatuses has a mounting portion for mounting the cover on the body of a vehicle, and the mounting portions are provided in positions that mutually differ from each other, and different types of covers can be selectively mounted in the case.

With the above-described configuration, by selectively mounting the plurality of types of covers in which mounting portions are provided at a plurality of different positions on the case, it is possible to mount the electrical apparatuses in a plurality of differing attitudes with respect to the vehicle body. In this case, the groove is provided in the case peripheral wall, so the efficacy of suppressing infiltration of liquids into the inside of the case is not affected at all. Through this, it is possible to reduce manufacturing costs in comparison to cases in which the shapes of the cover and case change for each of the plurality of mounting positions on the vehicle body.

With the technology disclosed in this specification, it is possible to provide an electrical apparatus equipped with a drip-proof structure for suppressing infiltration of water to the inside of the case and adhesion to the circuit structure.

DETAILED DESCRIPTION OF EMBODIMENTS

Embodiment 1

A first embodiment of the technology disclosed in this specification will be described with reference to FIG. 1 through FIG. 13. An electrical apparatus 1 shown in FIG. 1 through FIG. 13 is, for example, an electronic control unit (ECU), and supplies electric power to various vehicle-mounted electrical components from a power source such as a battery or the like, and controls the supplied electrical power.

Figure 3:
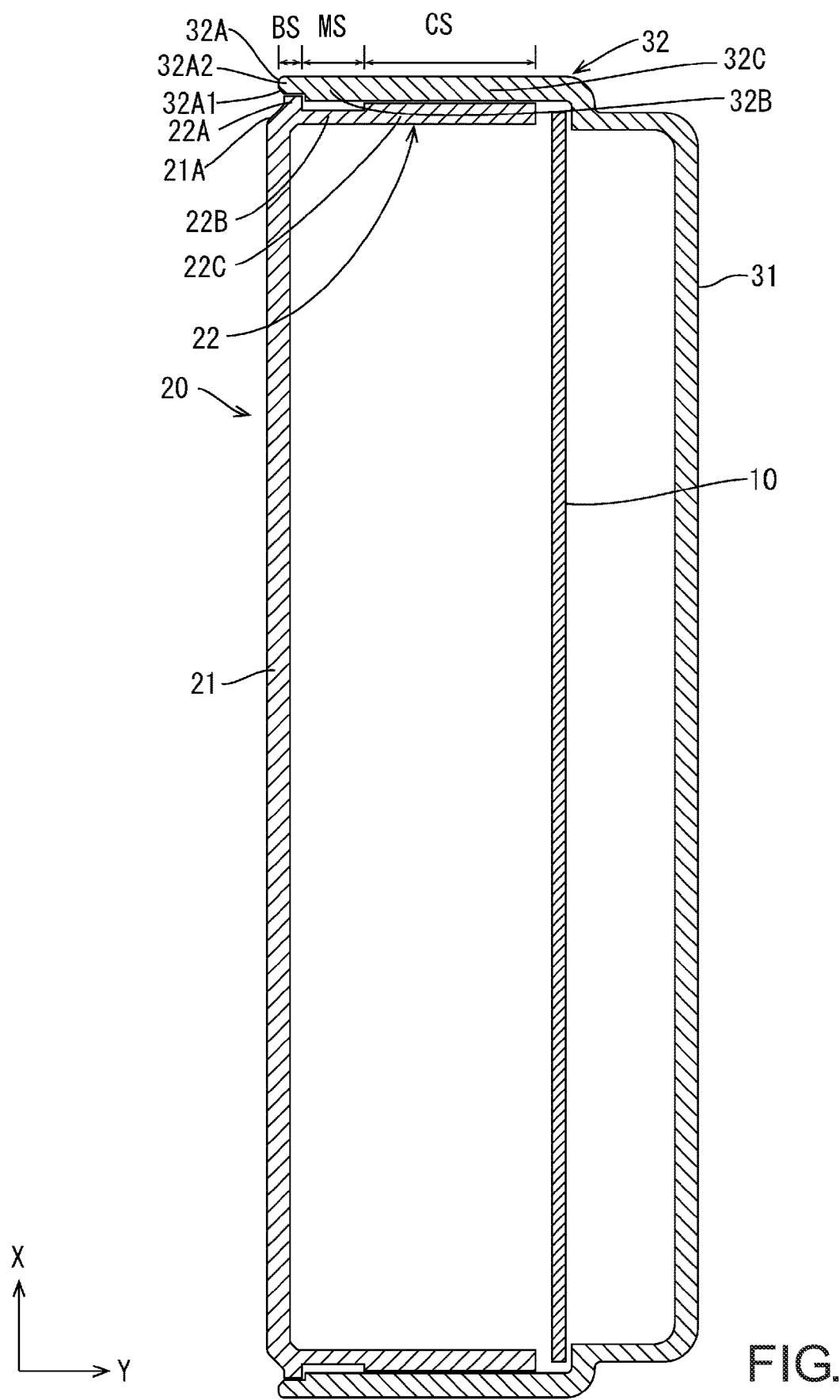
FIG. 3 is a cross-sectional view taken along line III-III in FIG. 2.

The electrical apparatus 1 is installed and used inside a vehicle cabin, and as shown in FIG. 3, comprises a plate-shaped circuit structure 10, a case 20 and a cover 30. The Y axis and Z axis notated in a number of the drawings respectively indicate the depth direction of the electrical apparatus 1 and the vehicle up-and-down direction when the electrical apparatus 1 is installed in a vehicle cabin. In addition, the X axis indicates the width direction that is orthogonal to the depth direction of the electrical apparatus 1 and the vehicle up-and-down direction.

The circuit structure 10 is provided with a circuit board equipped with a conducting circuit, and a plurality of electronic components mounted on the surface of the circuit board. The case 20 and the cover 30 are made of synthetic resin and are formed in a shallow box shape having an opening. The cover 30 is a size larger than the case 20 and is assembled on the case 20 so as to cover the opening thereof, so that a housing space is formed by the case 20 and the cover 30. The circuit structure 10 is housed in the housing space.

As shown in FIG. 5 through FIG. 8, the case 20 comprises a bottom panel 21 formed in a rectangular shape, and a case peripheral wall 22 standing erect from the peripheral edge of the bottom panel 21. The bottom panel 21 forms a shape in which the outer periphery corners are chamfered, and has a case-side inclined surface 21A. The case-side inclined surface 21A is formed along the entirety of the corner formed by the bottom panel 21 and the case peripheral wall 22.

Figure 1:
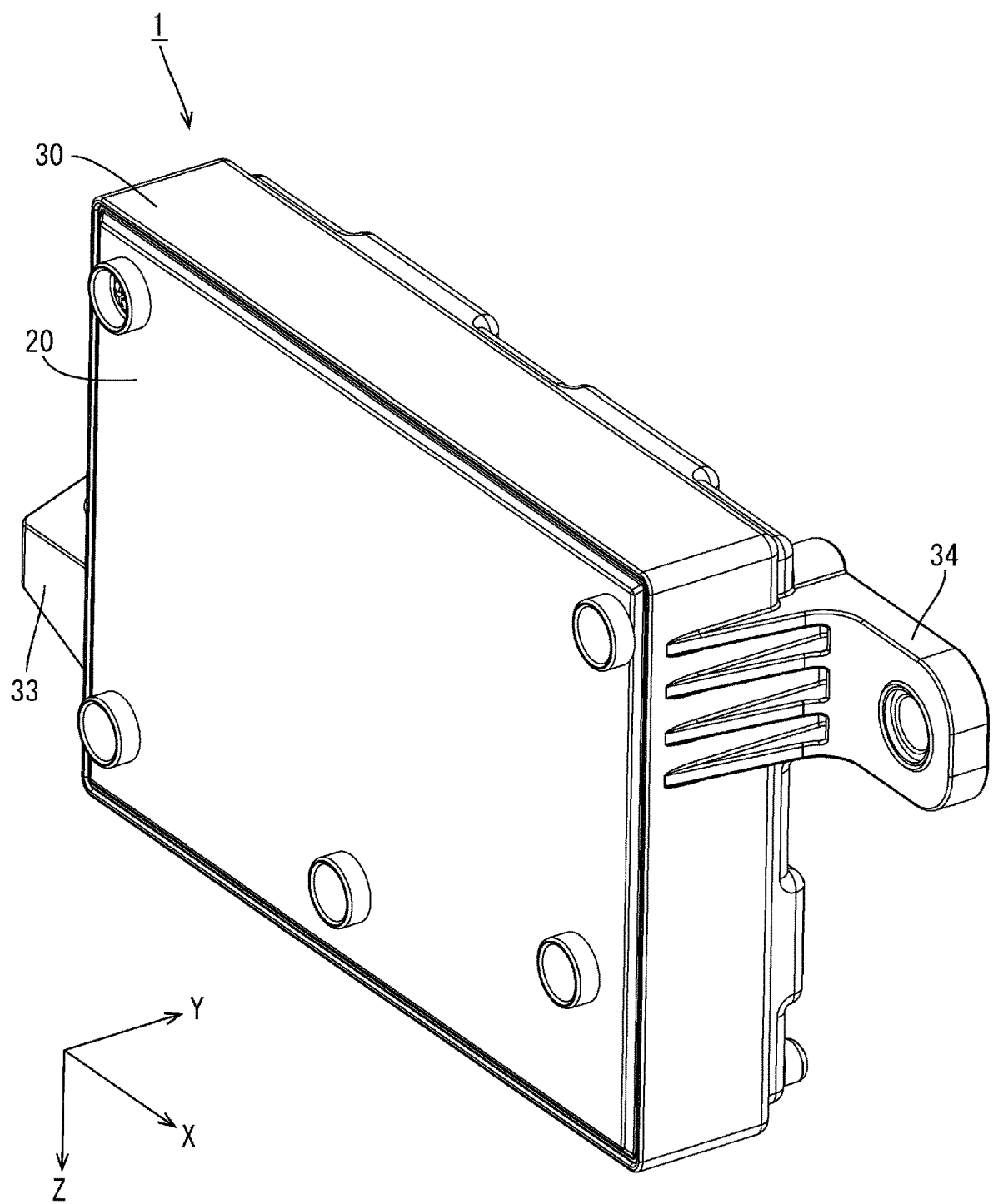
FIG. 1 is an oblique view showing an electrical apparatus according to Embodiment 1.
Figure 2:
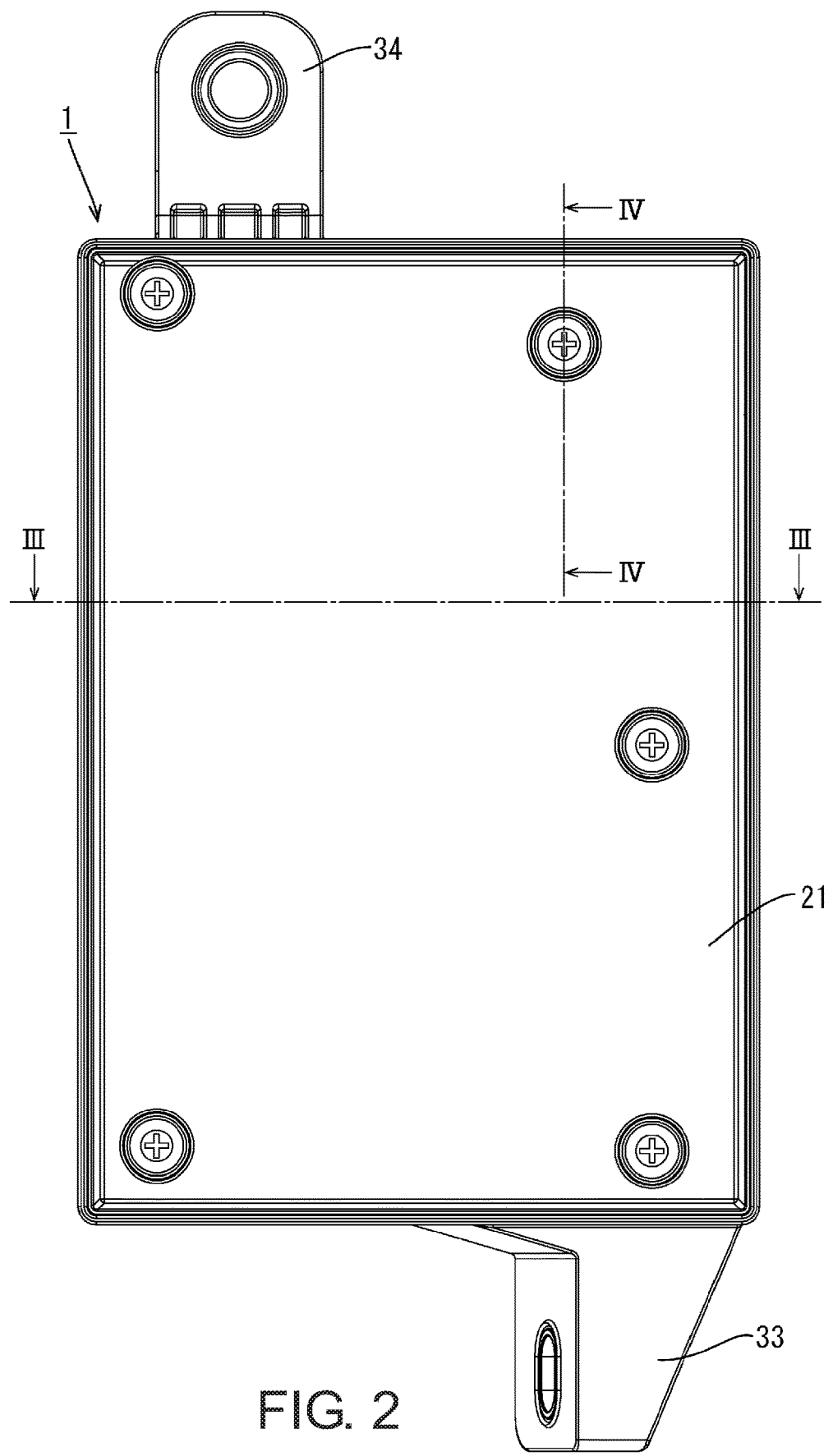
FIG. 2 is a bottom view of the electrical apparatus shown in FIG. 1.
Figure 4:
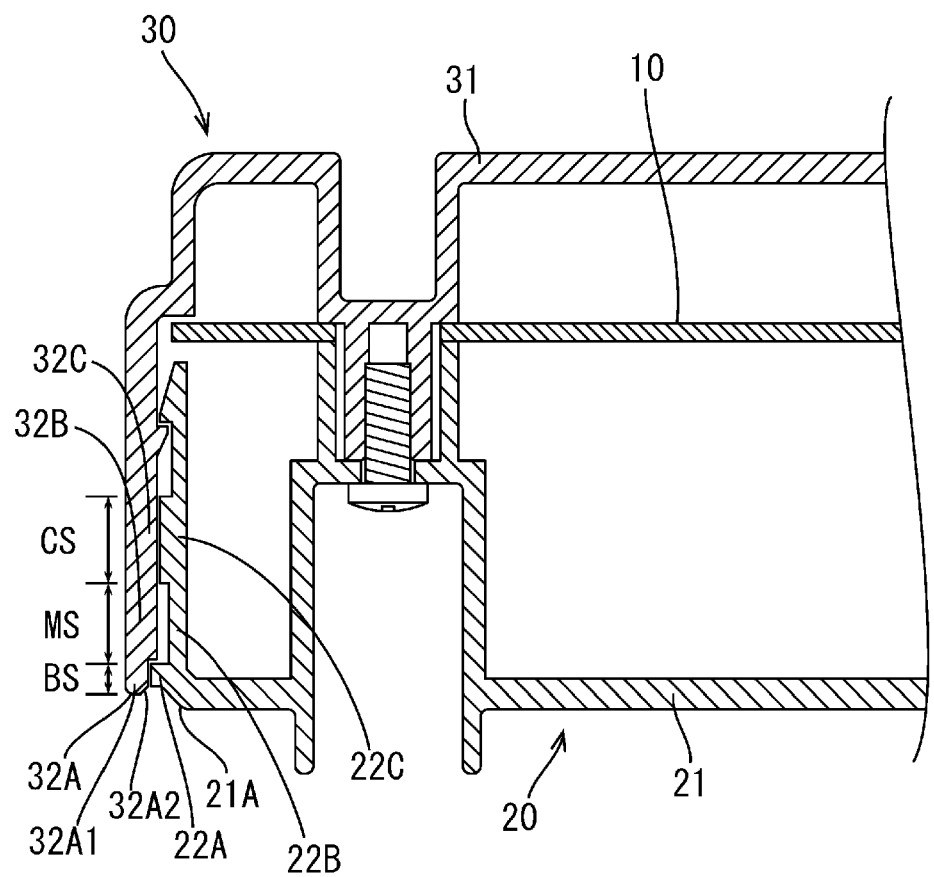
FIG. 4 is a cross-sectional view taken along line IV-IV in FIG. 2.
Figure 9:
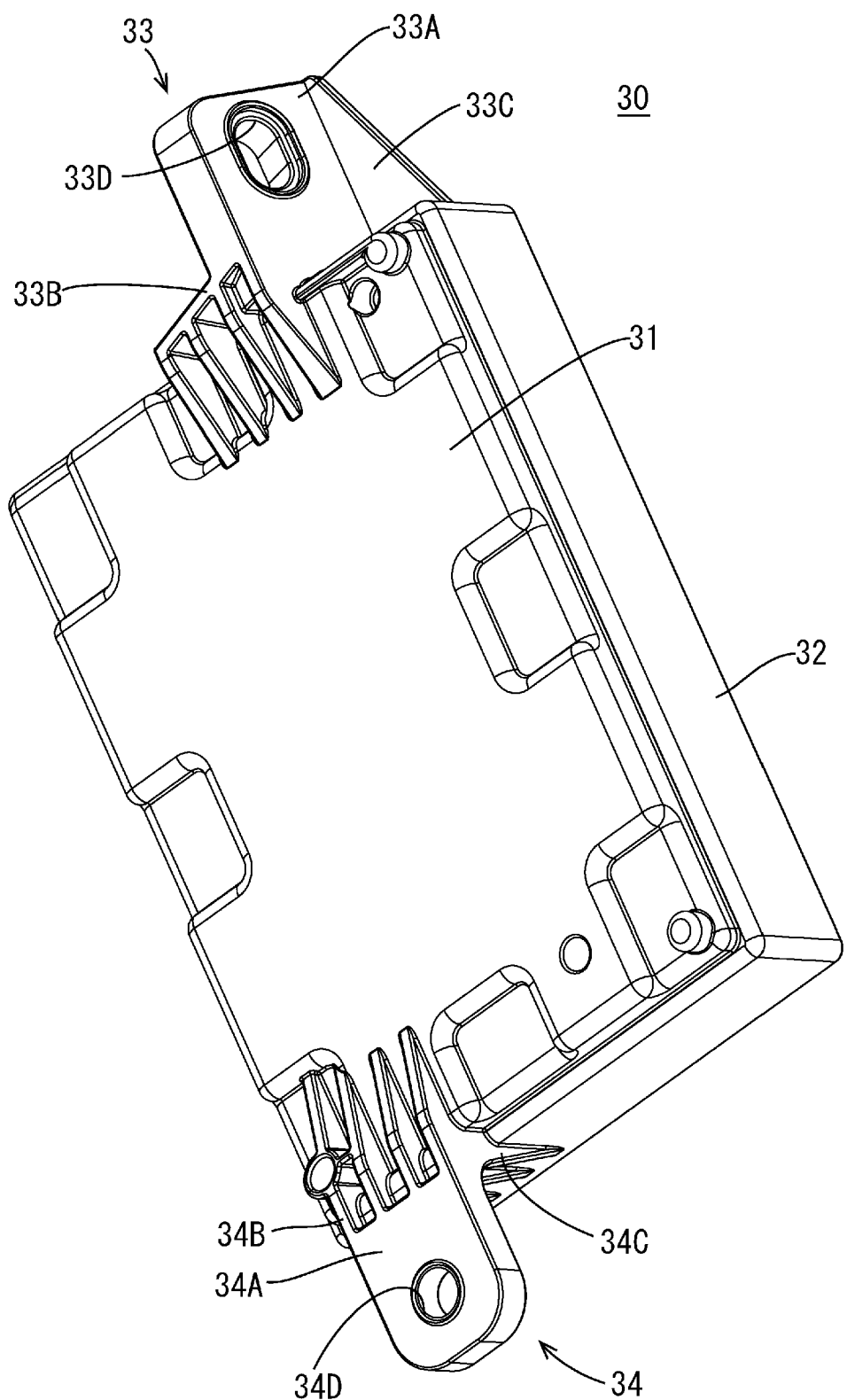
FIG. 9 is a perspective view showing the outside of a cover with which the electrical apparatus is equipped.
Figure 10:
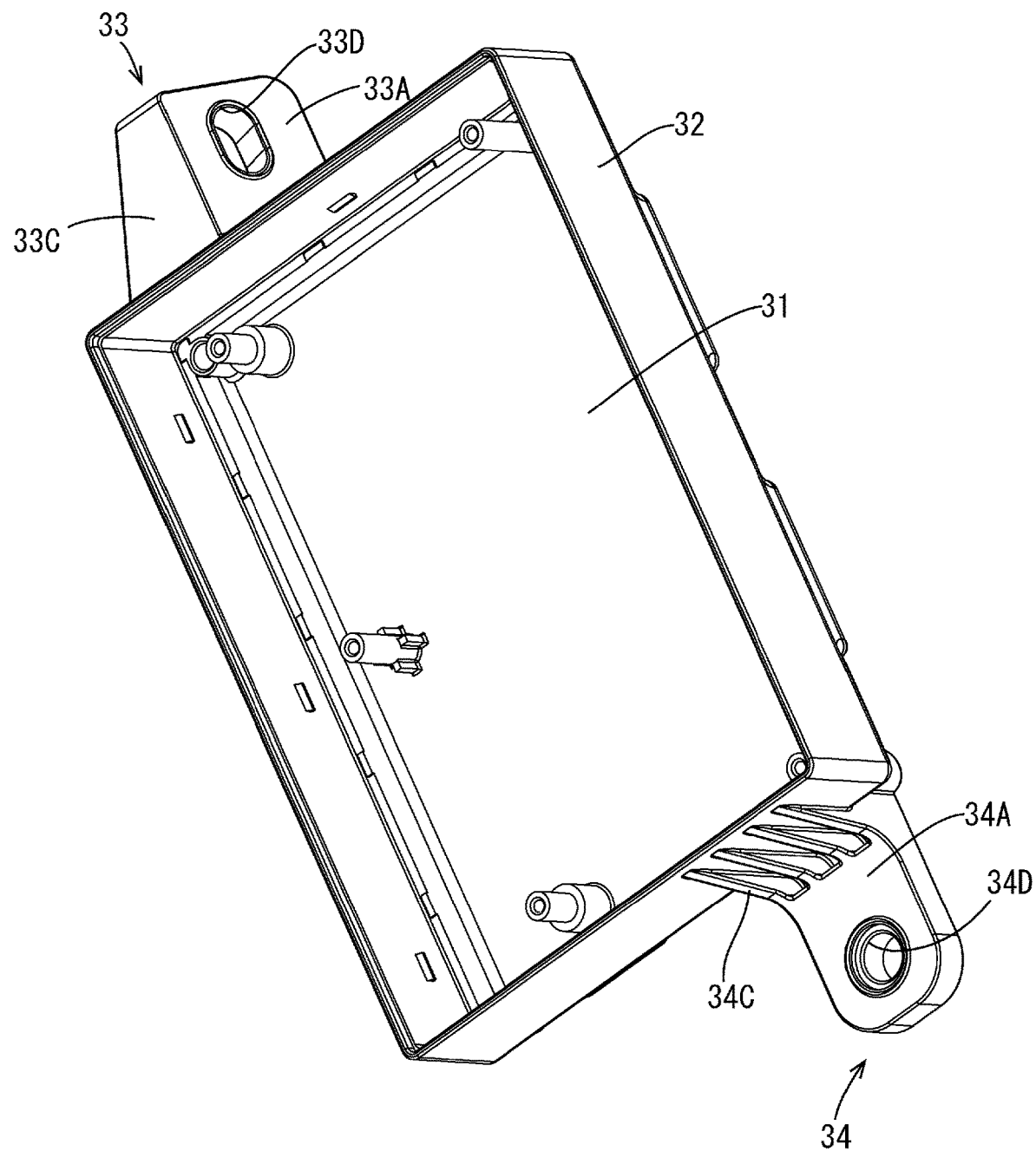
FIG. 10 is a perspective view showing the inside of the cover.

As shown in FIG. 9 and FIG. 10, the cover 30 comprises a cover panel 31 formed in a rectangular shape, and a cover peripheral wall 32 standing erect from the peripheral edge of the cover panel 31. As shown in FIG. 1, FIG. 3 and FIG. 4, the cover 30 is assembled on the case 20 in a state such that the inner surface of the cover peripheral wall 32 faces the case outer surface of the case peripheral wall 22, and is fixed with a screw 40.

Figure 5:
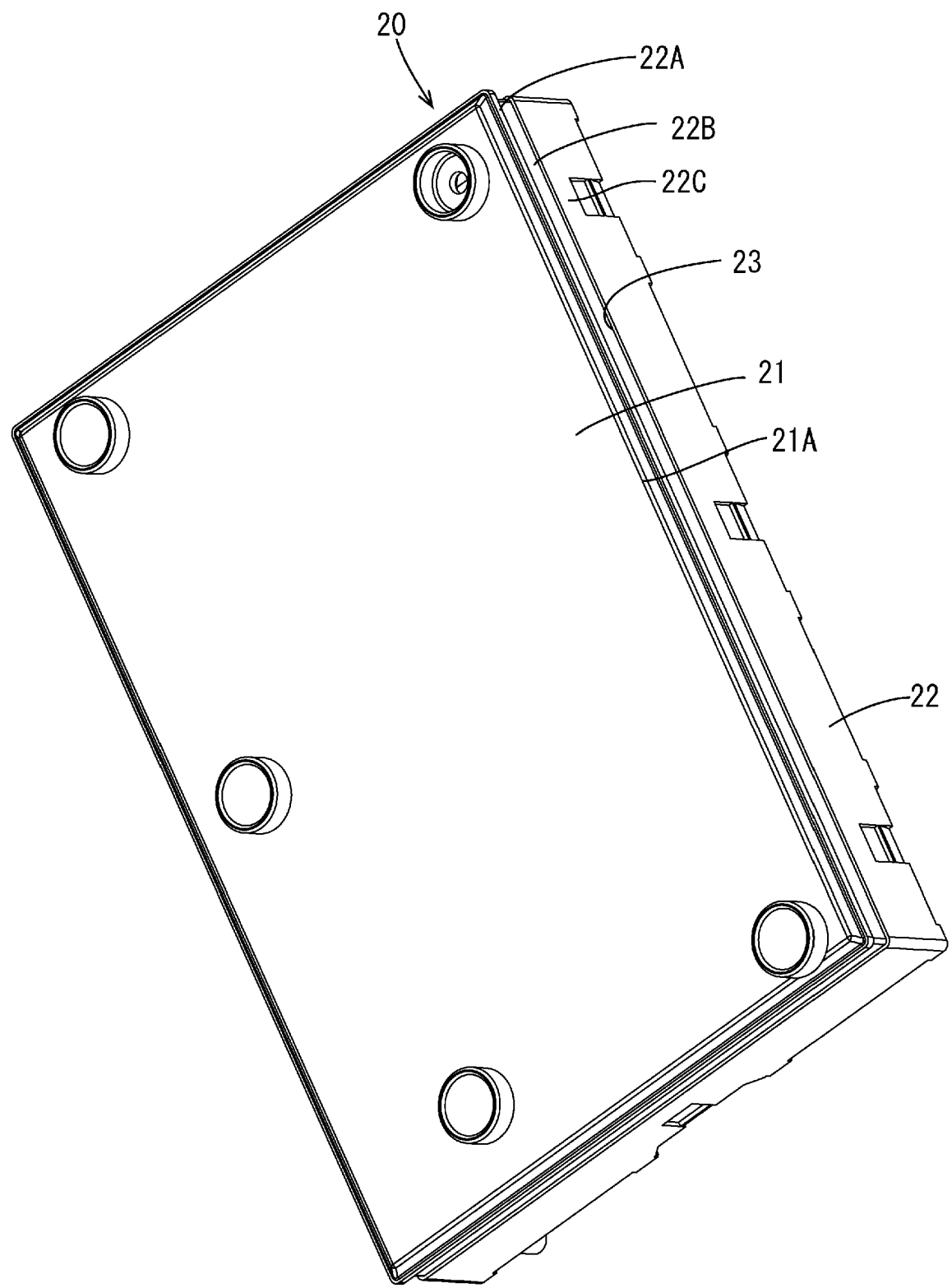
FIG. 5 is a perspective view showing the outside of a case with which the electrical apparatus is equipped.
Figure 6:
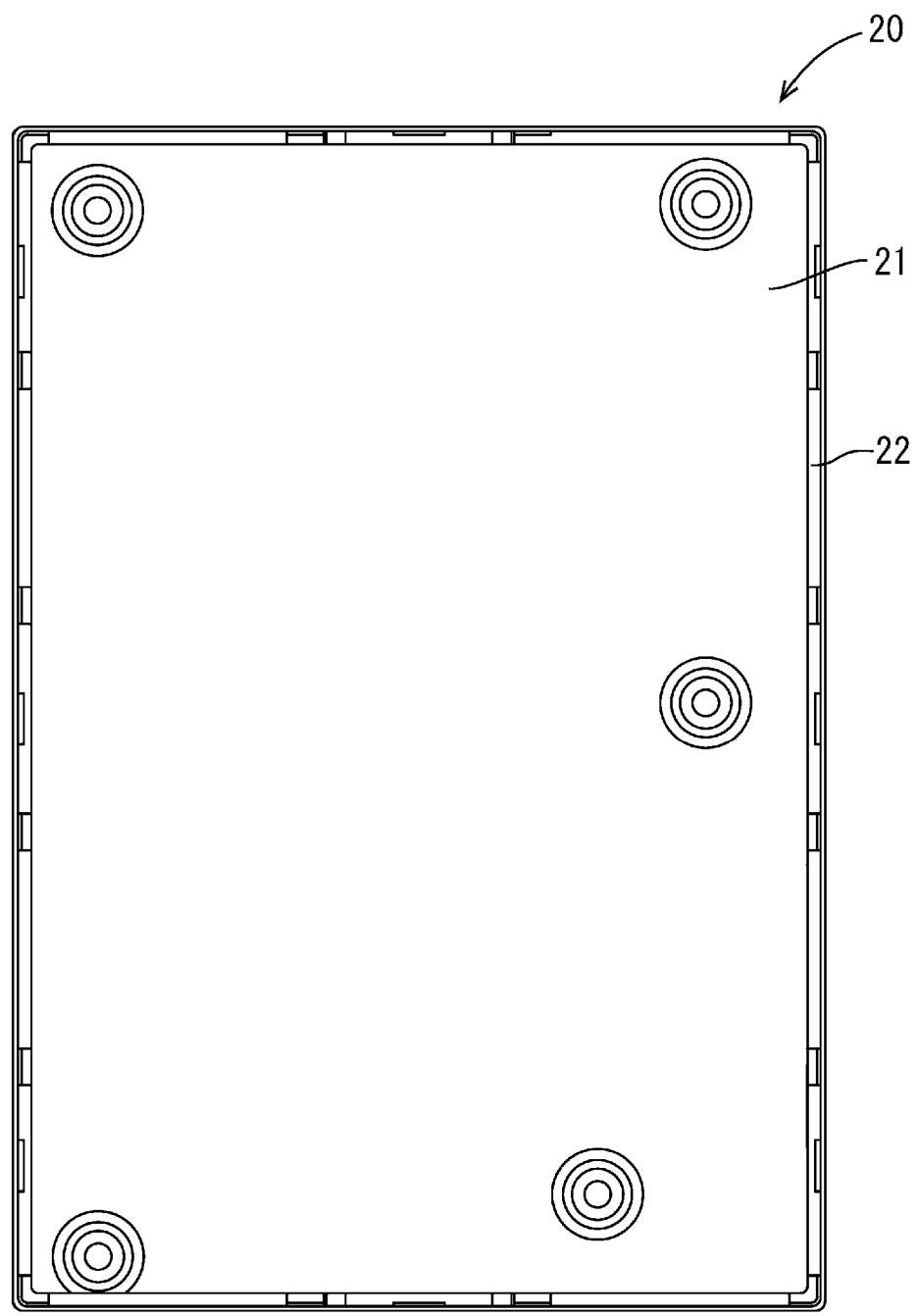
FIG. 6 is a plan view of the case.
Figure 7:
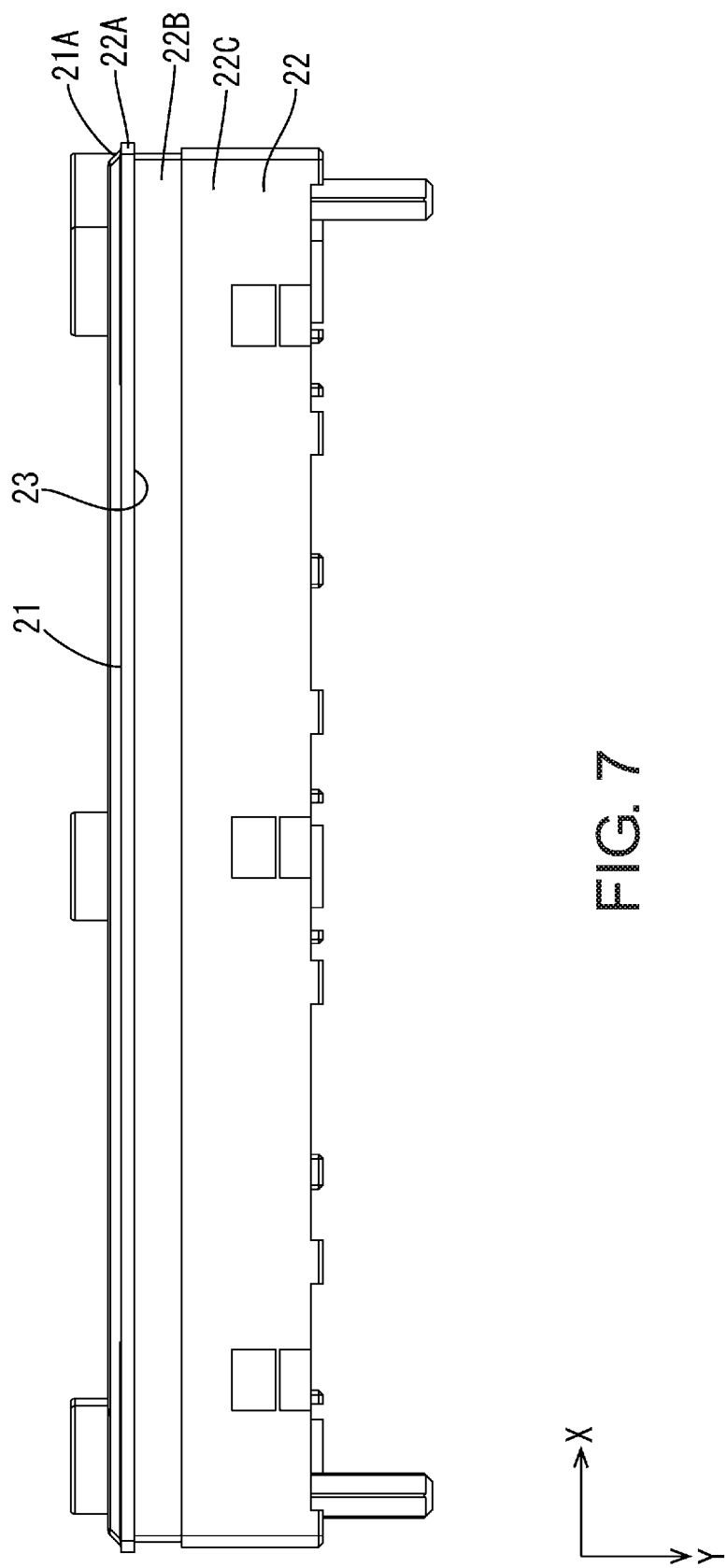
FIG. 7 is a long-side side view of the case.
Figure 8:
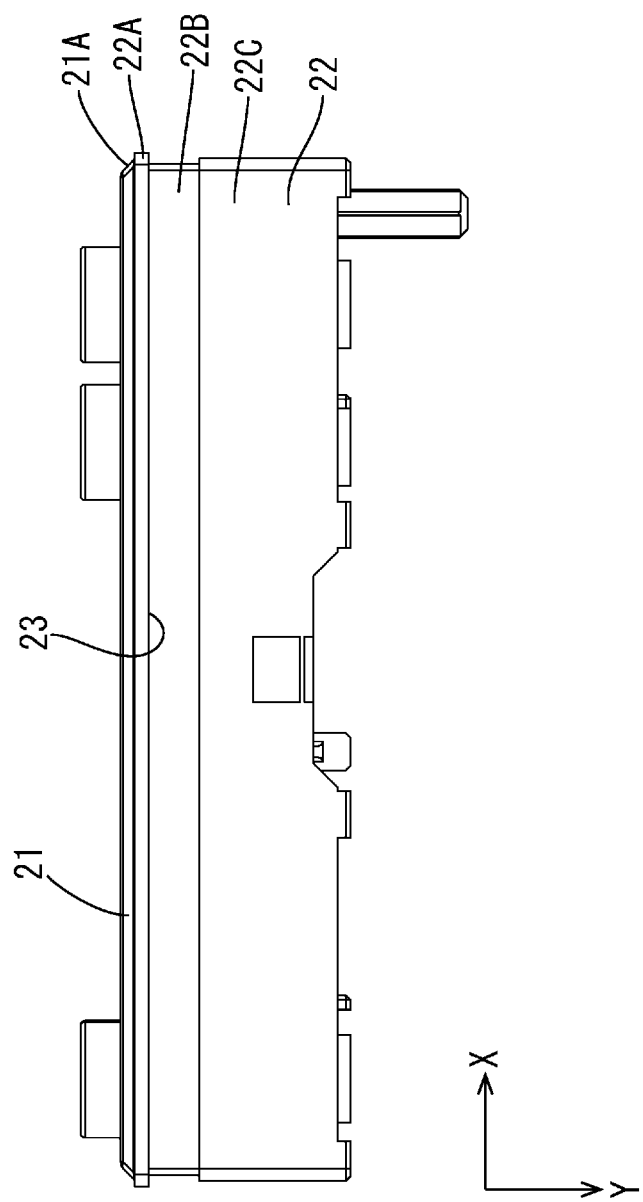
FIG. 8 is a short-side side view of the case.

As shown in FIG. 5, FIG. 7 and FIG. 8, a groove 23 is formed, extending along the entire periphery of the case 20, at a position of the case peripheral wall 22 adjacent to the bottom panel 21. As shown in FIG. 3, a region closer to the bottom panel 21 than the groove 23 of the electrical apparatus 1 is called a bottom panel-side region BS, a region closer to the cover panel 31 than the groove 23 is called a cover panel-side region CS, and the region interposed between the bottom panel-side region BS and the cover panel-side region CS is called a middle region MS. The groove 23 is formed in the middle region MS portion of the case peripheral wall 22. In FIG. 7 and FIG. 8, for convenience in explanation the case 20 is shown with the bottom panel 21 facing the top side.

A first case peripheral wall section 22A that is a portion of the case peripheral wall 22 within the bottom panel-side region BS faces a first cover peripheral wall section 32A that is a portion of the cover peripheral wall 32 within the bottom panel-side region BS, separated therefrom by a slight gap. This gap is open facing the outside, and the electrical apparatus 1 is installed inside the vehicle cabin such that the direction of the opening of this gap faces in a horizontal direction or downward with respect to the direction of gravity (the Z axis direction).

A second case peripheral wall section 22B that is a portion of the case peripheral wall 22 within the middle region MS faces a second cover peripheral wall section 32B that is a portion of the cover peripheral wall 32 within the middle region MS. The second case peripheral wall section 22B forms the bottom section of the groove 23, and the facing distance between the second case peripheral wall section 22B and the second cover peripheral wall section 32B is larger than the facing distance between the first case peripheral wall section 22A and the first cover peripheral wall section 32A.

A third case peripheral wall section 22C that is a portion of the case peripheral wall 22 within the cover panel-size region CS substantially abuts a third cover peripheral wall section 32C that is a portion of the cover peripheral wall 32 within the cover panel-side region CS. There is a possibility that the third case peripheral wall section 22C and the third cover peripheral wall section 32C are not in close contact and somewhat of a gap could arise, but in such cases, the facing distance between the third case peripheral wall section 22C and the third cover peripheral wall section 32C is smaller than the facing distance between the first case peripheral wall section 22A and the first cover peripheral wall section 32A. That is to say, the facing distance between the first case peripheral wall section 22A and the first cover peripheral wall section 32A is smaller than the facing distance between the second case peripheral wall section 22B and the second cover peripheral wall section 32B and larger than the facing distance between the third case peripheral wall section 22C and the third cover peripheral wall section 32C.

In addition, the first cover peripheral wall section 32A of the cover peripheral wall 32 has a protrusion 32A1 that protrudes beyond the end of the cover 30 side of the case-side inclined surface 21A. The protrusion 32A1 has an expanding shape in which the opening becomes larger the farther the tip edge is from the cover, and the inside surface thereof is an inclined surface that slopes toward the outside when moving away from the case 20 toward the tip edge, that is to say when moving away from the cover panel 31, and forms a cover-side inclined surface 32A2. The cover-side inclined surface 32A2 is formed along the entirety of the cover peripheral wall 32.

As shown in FIG. 9 and FIG. 10, the cover 30 has a first mounting portion 33 and a second mounting portion 34 for mounting the electrical apparatus 1 to the body of the vehicle. The first mounting portion 33 and the second mounting portion 34 are provided at positions diagonal from each other relative to the cover panel 31. More specifically, the first mounting portion 33 is positioned close to one corner of the cover 30, and the second mounting portion 34 is positioned near another corner diagonal from that corner.

The first mounting portion 33 has a mounting body 33A, a first rib 33B and a second rib 33C. The mounting body 33A has a plate shape protrudes from the outer surface of the cover peripheral wall 32 and is formed such that the plate surface is orthogonal to the outer surface of the cover panel 31. One section of the mounting body 33A on the outer surface side of the cover panel 31 protrudes beyond the outer surface of the cover panel 31, and a mounting hole 33D is formed in this section. The first rib 33B is provided in a shape extending to the outer surface of the cover panel 31 from the portion of the mounting body 33A protruding beyond the outer surface of the cover panel 31. The second rib 33C is provided on the opposite side of the mounting body 33A from the first rib 33B, and is provided in a shape extending to the outer surface of the cover peripheral wall 32 from the side wall of the mounting body 33A.

The second mounting portion 34 includes a mounting body 34A, a first rib 34B and a second rib 34C. The mounting body 34A has a plate shape, and the plate surface thereof is formed so as to be horizontal relative to the outer surface of the cover panel 31. A mounting hole 34D is provided in the mounting body 34A. The first rib 34B protrudes from the outer surface of the cover panel 31, and extends to the bottom edge of the mounting body 34A. The second rib 34C protrudes from the outer surface of the cover peripheral wall 32 and extends to the bottom edge of the mounting body 34A.

Figure 11:
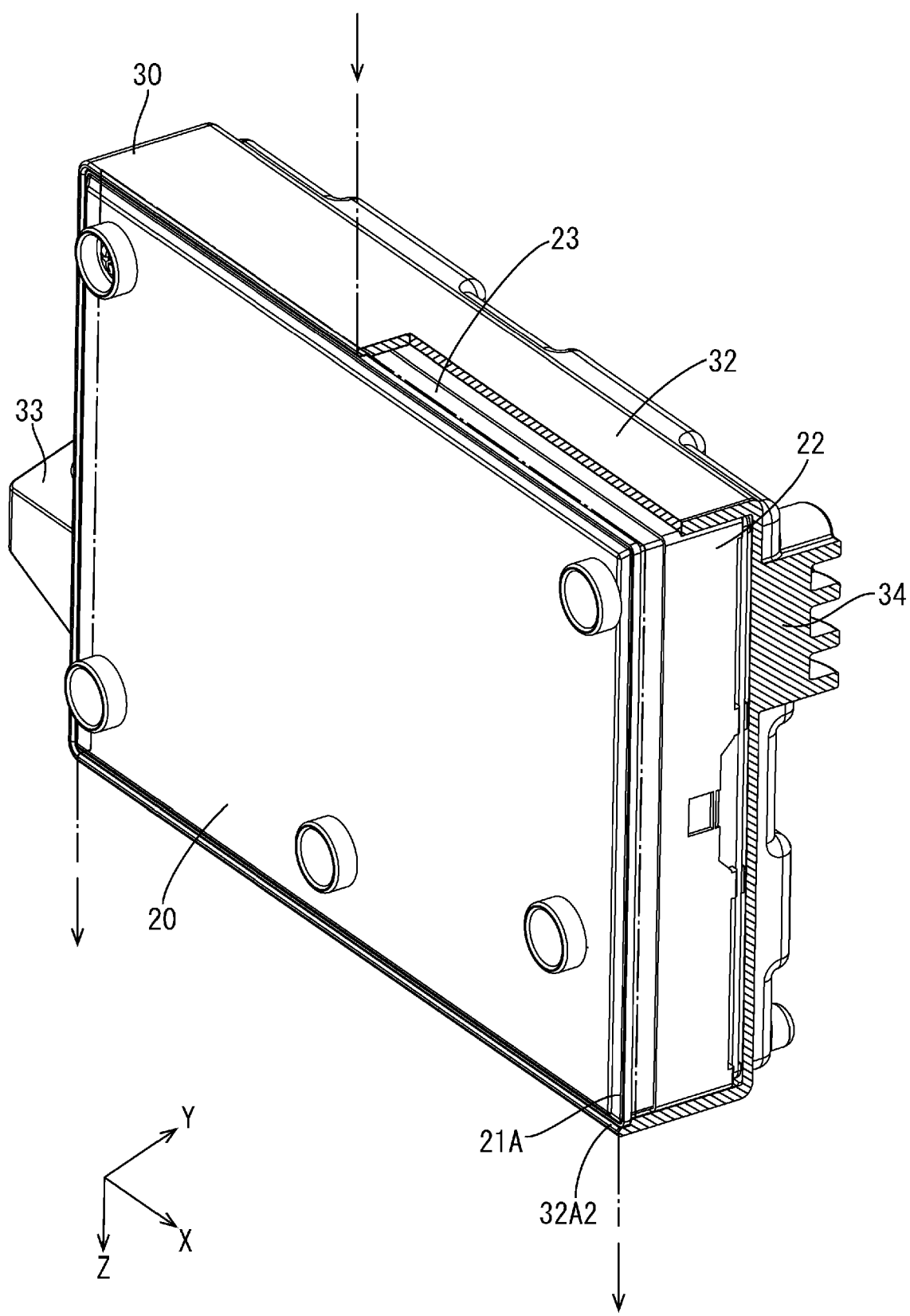
FIG. 11 is a perspective view showing the flow of a liquid when the electrical apparatus is mounted sideways.
Figure 12:
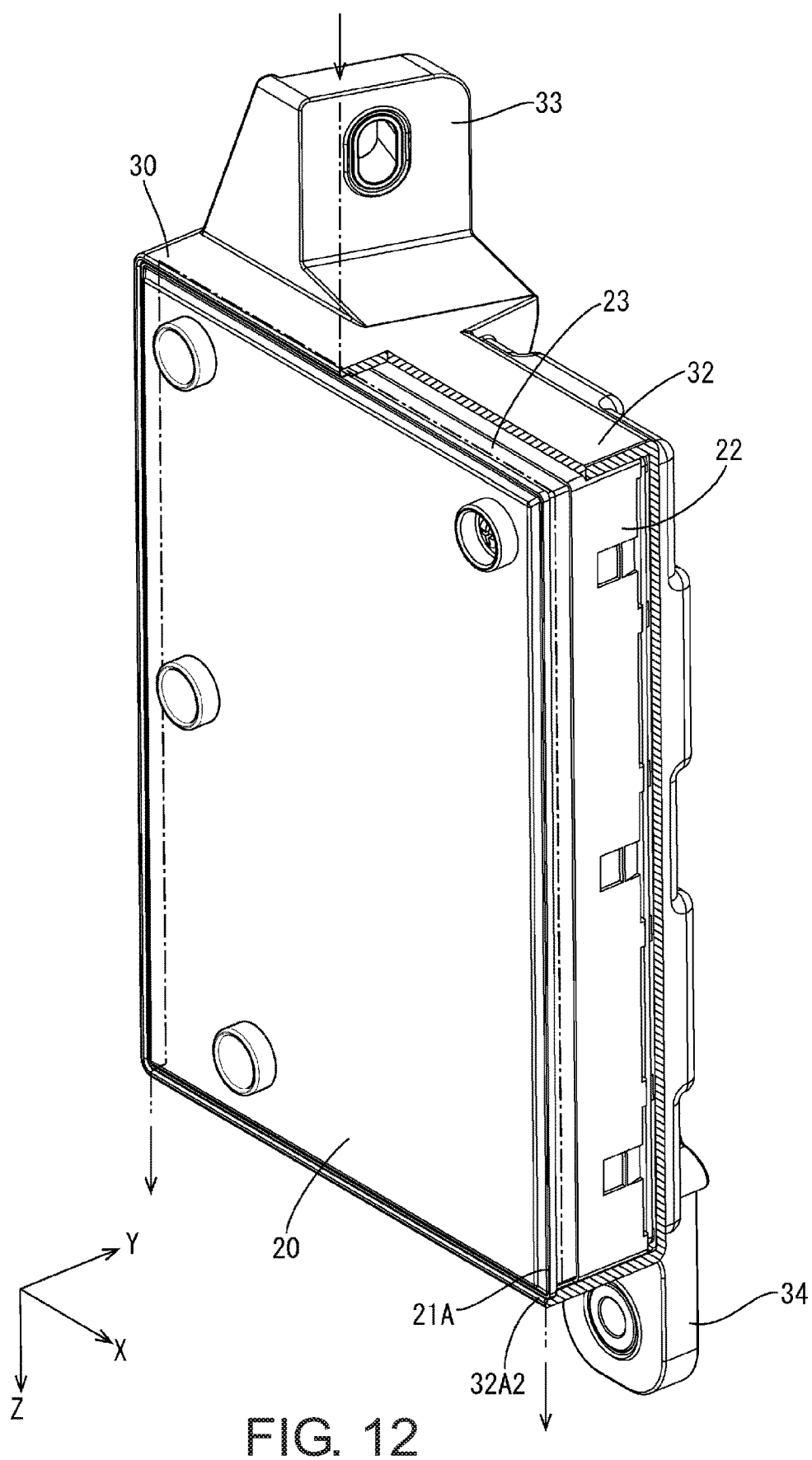
FIG. 12 is a perspective view showing the flow of a liquid when the electrical apparatus is mounted vertically.
Figure 13:
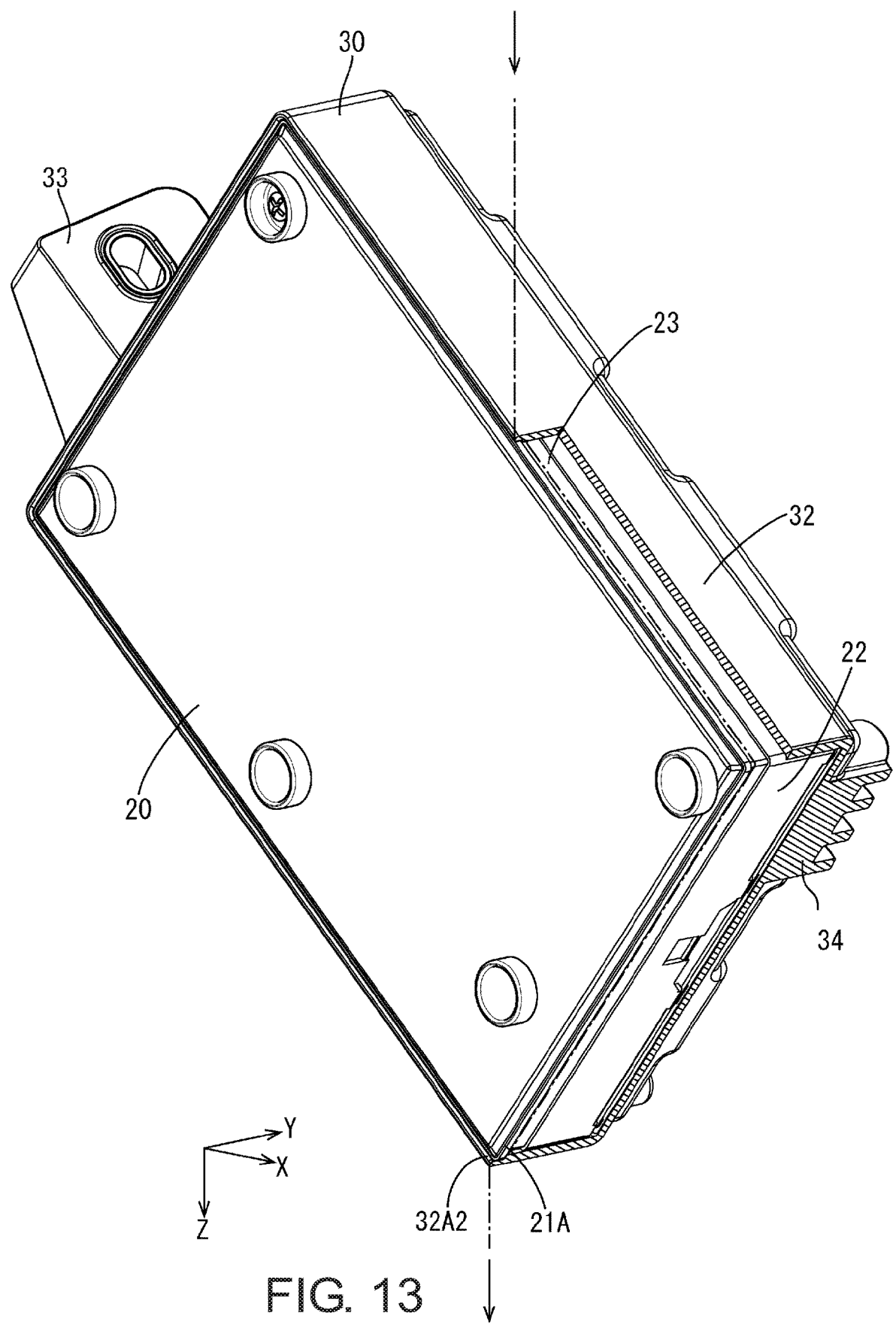
FIG. 13 is a perspective view showing the flow of a liquid when the electrical apparatus is mounted at an incline.

The electrical apparatus 1 can be mounted in various attitudes inside the vehicle cabin, by the first mounting portion 33 and the second mounting portion 34. Examples thereof are shown in FIG. 11 through FIG. 13. FIG. 11 shows a case in which the electrical apparatus 1 is mounted sideways, FIG. 12 shows a case in which the electrical apparatus 1 is mounted vertically and FIG. 13 shows a case in which the electrical apparatus 1 is mounted at an incline.

The flow of a liquid when the liquid has infiltrated the gap between the case peripheral wall 22 and the cover peripheral wall 32 to the electrical apparatus 1 mounted in the above-described attitudes is described below.

In a case in which the electrical apparatus 1 is mounted sideways as shown in FIG. 11 or is mounted vertically as shown in FIG. 12, the liquid that has infiltrated from the gap in the upper part flows to the groove 23 of the case peripheral wall 22 of the upper part as indicated by the dashed-line arrows, travels through the groove 23, flows to the groove 23 of the case peripheral wall 22 on the left and right, and flows down to the bottom-most position in the direction of gravity (Z axis direction), that is to say the bottom side corners on the left and right.

In addition, when the electrical apparatus 1 is mounted at an incline as shown in FIG. 13, the liquid that has infiltrated from the gap on the upper part flows to the groove 23 of the case peripheral wall 22 on the upper part, as indicated by the dashed-line arrows, travels through the groove 23, flows to the groove 23 of the case peripheral wall 22 on the bottom side, and flows down to the lowest position in the direction of gravity, that is to say to the lowest corner.

As described above, in the bottom panel-side region BS, there is a slight gap between the first cover peripheral wall section 32A and the first case peripheral wall section 22A, so the liquid that has flowed to the lowest position in the direction of gravity passes through this gap and is discharged.

Furthermore, the cover-side inclined surface 32A2 is provided at the tip edge of the cover peripheral wall 32, so the liquid that is discharged from the gap between the first cover peripheral wall section 32A and the first case peripheral wall section 22A is guided further down in the direction of gravity by the cover-side inclined surface 32A2, and is quickly discharged from inside the electrical apparatus 1.

Next, the operation and efficacy of this embodiment will be described. When the electrical apparatus 1 according to this embodiment is such that liquid has adhered to the tip edge of the cover peripheral wall 32, there is a concern that the liquid could infiltrate to the inside of the case 20 through the capillary phenomenon from the gap where the case peripheral wall 22 and the cover peripheral wall 32 face each other. The electrical apparatus 1 is provided with a groove 23 along the entire periphery of the outer surface of the case peripheral wall 22 in the middle region MS, so even if the liquid infiltrates into the bottom panel-side region BS and the middle region MS through the capillary phenomenon, it is possible to keep the liquid from infiltrating the cover panel-side region CS inward beyond the groove 23.

In addition, the groove 23 is formed along the entire periphery of the outer surface of the case peripheral wall 22, so from any position in the circumferential direction of the electrical apparatus 1, liquid that has adhered to the tip edge of the cover peripheral wall 32 and infiltrated from the gap between the case peripheral wall 22 and the cover peripheral wall 32 in the bottom panel-side region BS can be kept from infiltrating into the cover panel-side region CS.

Furthermore, the liquid that has flowed into the inside of the groove 23 flows down to the section of the groove 23 positioned at the very bottom in the direction of gravity and in the bottom panel-side region BS is discharged to the outside through the gap between the case peripheral wall 22 and the cover peripheral wall 32, so it is possible to reliably suppress infiltration of liquid to the inside of the electrical apparatus.

In addition, it is possible to mount the electrical apparatus on the vehicle body so that the opening direction of the gap between the case peripheral wall 22 and the cover peripheral wall 32 in the bottom panel-side region BS faces downward in the direction of gravity, by the first mounting portion 33 and the second mounting portion 34, so it is possible to cause the liquid that has flowed down from above to adhere to the gap between the outer surface of the case peripheral wall 22 and the inner surface of the cover peripheral wall 32. Through this, it is possible to keep liquid from infiltrating into the inside of the electrical apparatus 1 from the gap between the outer surface of the case peripheral wall 22 and the inner surface of the cover peripheral wall 32.

In addition, the bottom panel 21 has a case-side inclined surface 21A, and the case-side inclined surface 21A is formed along the entire periphery of the corner formed by the bottom panel 21 and the case peripheral wall 22. By providing the case-side inclined surface 21A in the bottom panel 21, it is possible to cause liquid that has straddled and adhered to the bottom panel 21 of the case 20 and the tip edge of the cover peripheral wall 32 to be caused to quickly flow down to the outer surface of the bottom panel 21 by the case-side inclined surface 21A. Through this, it is possible to reduce the liquid that infiltrates into the gap between the outer surface of the case peripheral wall 22 and the inner surface of the cover peripheral wall 32, from the gap between the tip edge of the cover peripheral wall 32 and the bottom panel 21.

In addition, the liquid that has traveled along the groove 23 and flowed down to the bottom-most position in the direction of gravity flows down to the tip edge of the cover peripheral wall 32 through the gap between the outer surface of the case peripheral wall 22 and the inner surface of the cover peripheral wall 32. Because the protrusion 32A1 is formed at the tip edge of the cover peripheral wall 32, the liquid is guided downward in the direction of gravity by the cover-side inclined surface 32A2 and is quickly discharged from inside the electrical apparatus 1. In addition, by forming the cover-side inclined surface 32A2 along the entire periphery, it is possible to more reliably discharge the liquid that has flowed through the groove 23 from any position in the circumference direction of the electrical apparatus 1.

In addition, it is possible to keep the liquid flowing down from above from adhering to the section of the bottom panel 21 of the case 20 positioned to the bottom in the direction of gravity from the cover peripheral wall 32, through the protrusion 32A1. Through this, it is possible to keep the liquid from adhering to the boundary section between the cover peripheral wall 32 and the bottom panel 21 of the case 20, so it is possible to keep the liquid from infiltrating into the gap between the outer surface of the case peripheral wall 22 and the inner surface of the cover peripheral wall 32.

In addition, the facing distance between the first case peripheral wall section 22A and the first cover peripheral wall section 32A is smaller than the facing distance between the second case peripheral wall section 22B and the second cover peripheral wall section 32B, and larger than the facing distance between the third case peripheral wall section 22C and the third cover peripheral wall section 32C.

Through the above-described configuration, even when liquid has infiltrated from the bottom panel-side region BS, it is possible to sufficiently receive the liquid through the groove 23 formed in the middle region MS, because the facing distance between the outer surface of the case peripheral wall 22 and the inner surface of the cover peripheral wall 32 in the bottom panel-side region BS is smaller than the facing distance between the outer surface of the case peripheral wall 22 and the inner surface of the cover peripheral wall 32 in the middle region MS.

In addition, liquid that has flowed to the inside of the groove 23 formed in the middle region MS flows down to the section of the groove 23 that is positioned at the very bottom in the direction of gravity, but because the facing distance between the outer surface of the case peripheral wall 22 and the inner surface of the cover peripheral wall 32 in the bottom panel-side region BS is larger than the facing distance between the outer surface of the case peripheral wall 22 and the inner surface of the cover peripheral wall 32 in the cover panel-side region CS, the liquid that has flowed down to the bottom-most position of the groove 23 more easily flows to the bottom panel-side region BS than the cover panel-side region CS, and is discharged to the outside through the gap where the case peripheral wall 22 and the cover peripheral wall 32 face each other in the bottom panel-side region BS. Through this, it is possible to suppress infiltration of liquid inward beyond the middle region MS of the electrical apparatus 1.

Embodiment 2

Figure 14:
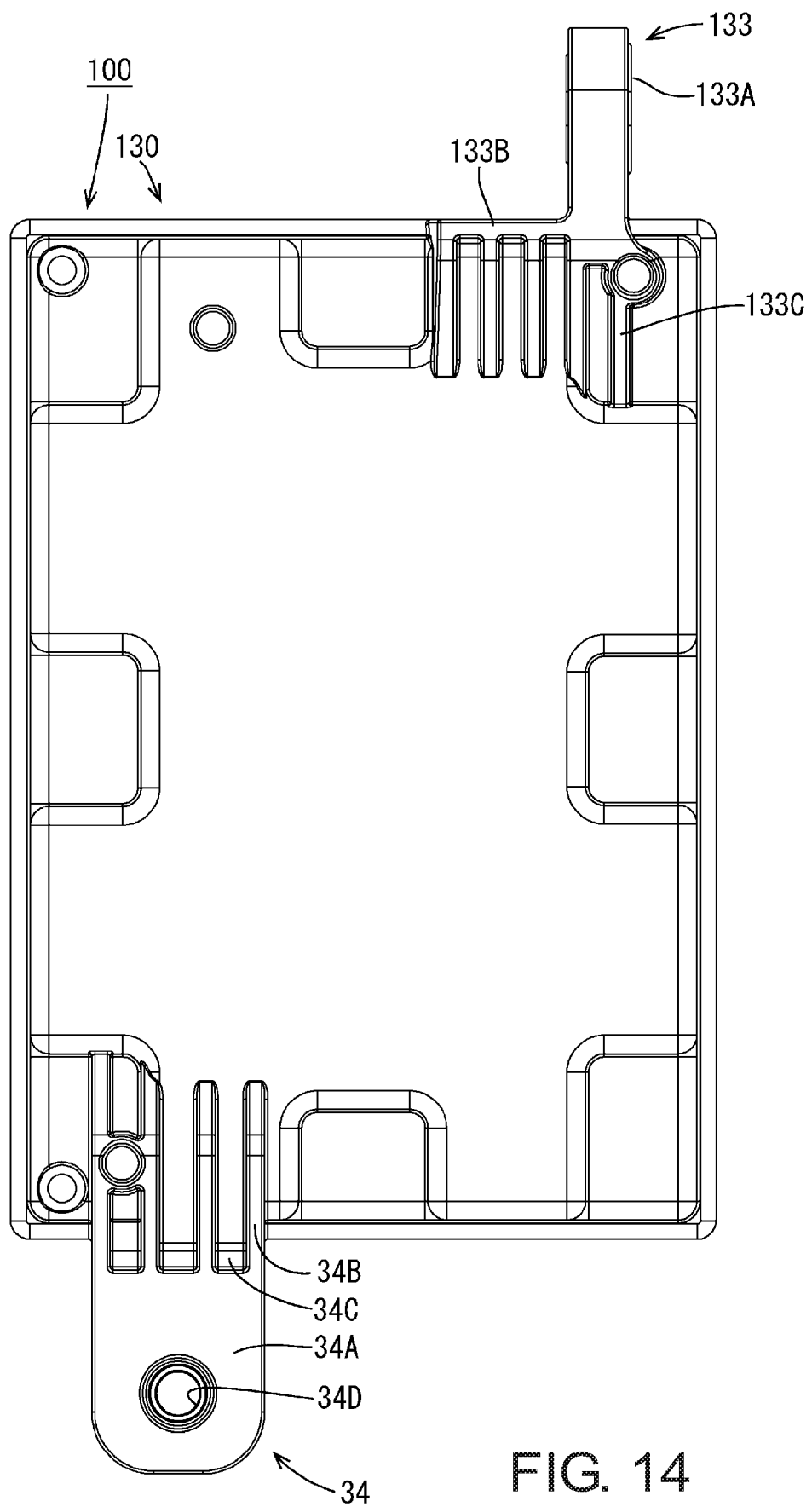
FIG. 14 is a plan view showing an electrical apparatus according to Embodiment 2.

Next, Embodiment 2 of the technology disclosed in this specification will be described with reference to FIG. 14. A cover 130 with which an electrical apparatus 100 according to this embodiment is equipped includes a first mounting portion 133 differing from the first mounting portion 33 of the above-described Embodiment 1. Structures other than this are the same as the structures in the above-described Embodiment 1, so description is omitted here. In addition, the operation and efficacy are the same as in the above-described Embodiment 1, so redundant description of such is omitted.

The first mounting portion 133 of this embodiment is provided near the corner diagonal from the corner to which the second mounting portion 34 is near. The first mounting portion 133 of this embodiment includes a mounting body 133A, a first rib 133B and a second rib 133C. The mounting body 133A and the first rib 133B have the same configuration as the mounting body 33A and the first rib 33B of Embodiment 1, so description of such is omitted here.

The second rib 33C of Embodiment 1 is provided on the opposite side of the mounting body 33A from the first rib 33B, but the second rib 133C in this embodiment is provided on the same side of the mounting body 133A as the first rib 133B.

With this kind of configuration, it is possible to attach the electrical apparatus 100 in the vehicle cabin in locations differing from the electrical apparatus 1 according to Embodiment 1.

Embodiment 3

Figure 15:
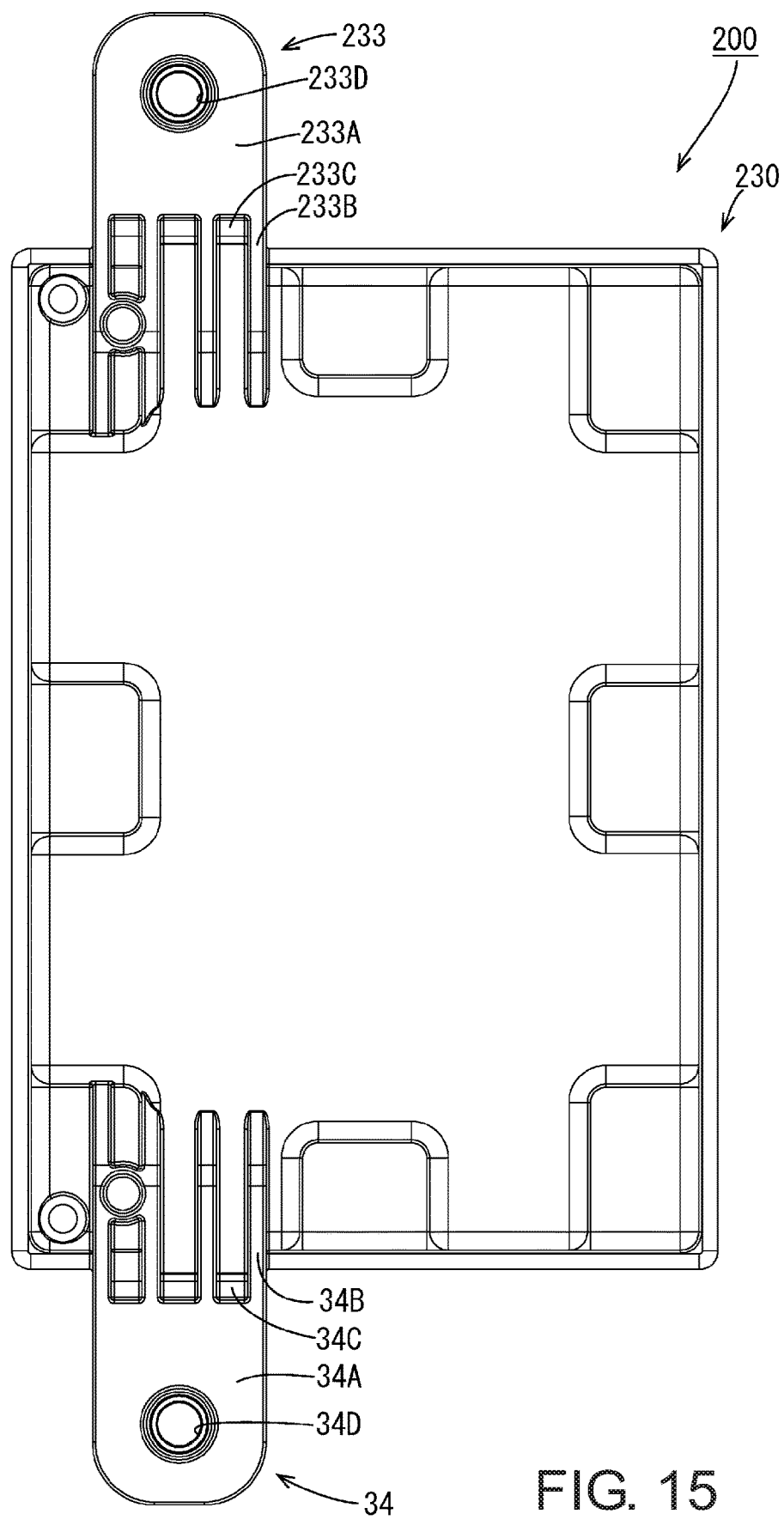
FIG. 15 is a plan view showing an electrical apparatus according to Embodiment 3.

Next, Embodiment 3 of the technology disclosed in this specification will be described with reference to FIG. 15. A cover 230 with which an electrical apparatus 200 according to this embodiment is equipped includes a first mounting portion 233 that differs from the first mounting portion 33 of the above-described Embodiment 1 and the first mounting portion 133 of the above-described Embodiment 2. Structures other than this are the same as the structures in the above-described Embodiments 1 and 2, so description is omitted here. In addition, the operation and efficacy are the same as in the above-described Embodiments 1 and 2, so redundant description of such is omitted.

The first mounting portion 233 of this embodiment is provided near a corner having a common side with the corner to which the second mounting portion 34 is near. The first mounting portion 233 of this embodiment includes a structure having line symmetry with the second mounting portion 34, and comprises a mounting portion body 233A, a first rib 233B, a second rib 233C and a mounting hole 233D corresponding respectively to the mounting body 34A, the first rib 34B, the second rib 34C and the mounting hole 34D of the second mounting portion 34.

With this kind of configuration, it is possible to mount the electrical apparatus 200 in a vehicle cabin in locations differing from the electrical apparatus 1 according to Embodiment 1 and the electrical apparatus 100 according to Embodiment 2.

Embodiment 4

Figure 16:
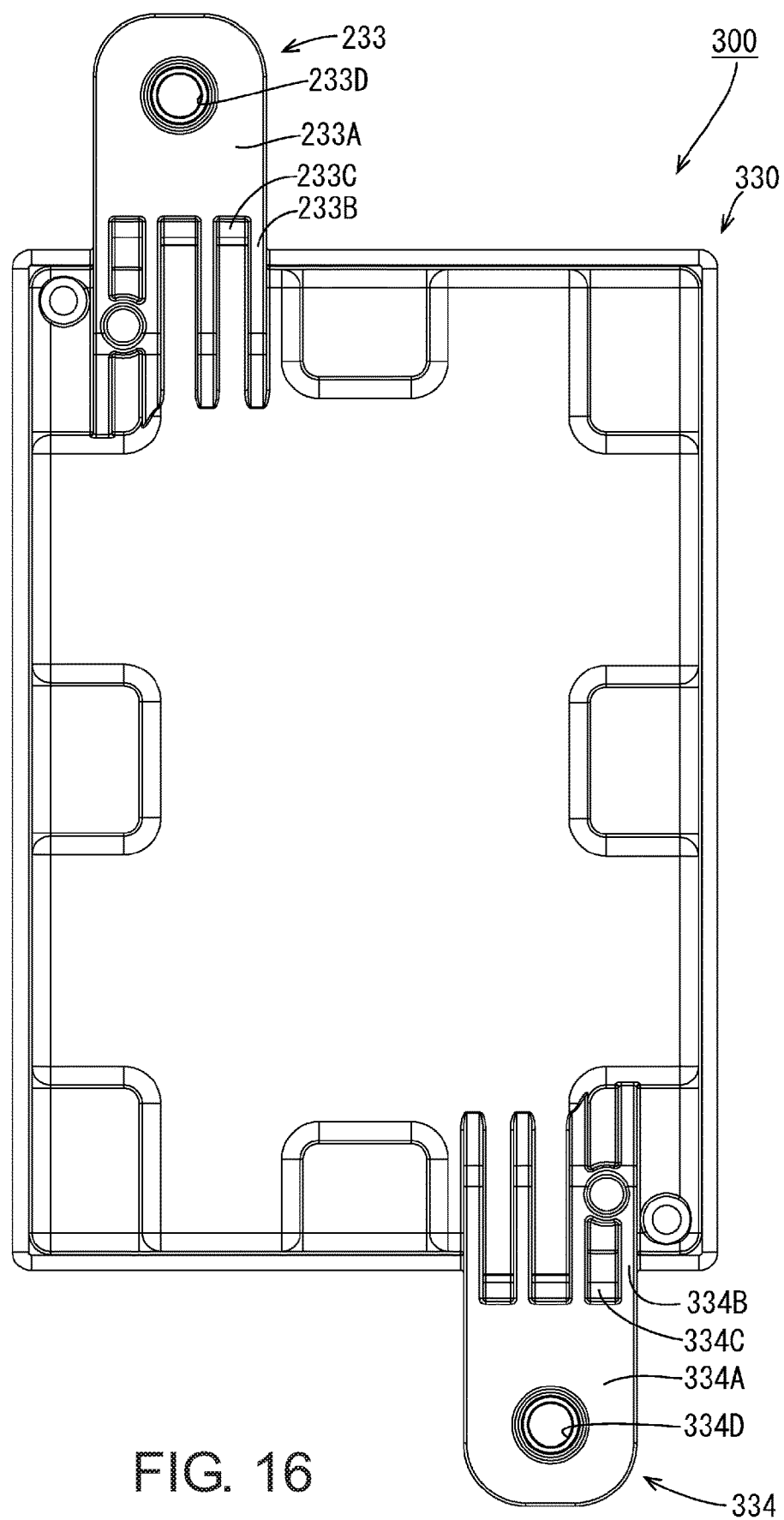
FIG. 16 is a plan view showing an electrical apparatus according to Embodiment 4.

Next, Embodiment 4 of the technology disclosed in this specification will be described with reference to FIG. 16. A cover 330 with which an electrical apparatus 300 according to this Embodiment is equipped includes a second mounting portion 334 differing from the second mounting portion 34 of the above-described Embodiment 3. Structures other than this are the same as the structures in the above-described Embodiment 3, so description is omitted here. In addition, the operation and efficacy are the same as in the above-described Embodiment 3, so redundant description of such is omitted.

The second mounting portion 334 of this embodiment is provided near a corner that is diagonal from the corner to which the first mounting portion 233 is close. The first mounting portion 233 has the same structure as the first mounting portion 233 of Embodiment 3, so description of such is omitted here. The second mounting portion 334 has a structure with line symmetry with the first mounting portion 233, and comprises a mounting body 334A, a first rib 334B, a second rib 334C and a mounting hole 334D respectively corresponding to the mounting body 233A, the first rib 233B, the second rib 233C and the mounting hole 233D.

With this kind of configuration, it is possible to mount the electrical apparatus 300 in a vehicle cabin at a location differing from that of the electrical apparatus 1 according to Embodiment 1, the electrical apparatus 100 according to Embodiment 2 and the electrical apparatus 200 according to Embodiment 3.

Other Embodiments

The technology disclosed in this specification is not limited by the embodiments described through the drawings and the foregoing descriptions, and for example, the following kinds of embodiments are also included within the technical scope of the technology disclosed in this specification.

(1) In the above-described Embodiments, the groove 23 is provided in the outer surface of the case peripheral wall 22, but a similar groove may be provided in the inner surface of the cover peripheral wall 32. In addition, a groove may be provided in either one of the outer surface of the case peripheral wall 22 or the inner wall of the cover peripheral wall 32, or may be provided in both.

(2) The above-described Embodiments are equipped with mounting portions of differing configurations, but the mounting portions are not limited to the configurations in the above-described Embodiments and may have a configuration in accordance with the mounting location in the vehicle cabin.

(3) The groove may be provided in only the inner surface of the cover peripheral wall 32. By providing the groove in only the inner surface of the cover peripheral wall 32, it is possible to use a common case for the different types of covers equipped with mounting portions having differing configurations as described in (2) above.

(4) An electrical apparatus system comprising a plurality of the above-described electrical apparatuses is also included within the scope of the technology disclosed in this specification. A plurality of electrical apparatuses may be equipped with covers in which mounting portions having the same configuration or differing configurations are provided in a plurality of mutually differing locations, and the plurality of differing covers can be selectively mounted on the case.

With the above-described configuration, it is possible to mount the electrical apparatus in a plurality of different attitudes on the body of the vehicle. In this case, the groove is provided in the case peripheral wall, so no effect of any kind is had on the efficacy in terms of suppressing infiltration of liquids into the case. Through this, it is possible to reduce manufacturing costs compared to the case of changing the shapes of the cover and case for each of a plurality of mounting positions on the vehicle body.

(5) In these embodiments, the technology disclosed in this specification was applied to an ECU, but this is intended to be illustrative and not limiting, for the technology disclosed in this specification may be also be applied to an electrical connection box including a circuit structure equipped with a switching element, and can be applied to an arbitrary electric apparatus as needed.

DESCRIPTION OF REFERENCE SYMBOLS 1, 100, 200, 300 Electrical apparatus
10 Circuit structure
20 Case
21 Bottom panel
21A Case-side inclined surface
22 Case peripheral wall
22A First case peripheral wall section
22B Second case peripheral wall section
22C Third case peripheral wall section
23 Groove
30, 130, 230, 330 Cover
31 Cover panel
32 Cover peripheral wall
32A1 Protrusion
33, 133, 233 First mounting portion
34, 334 Second mounting portion
40 Screw
BS Bottom panel-side region
CS Cover panel-side region
MS Middle region
What is claimed is:

What is claimed is:
1. An electrical apparatus comprising:
a circuit structure;
a case provided with a bottom panel and a case peripheral wall standing erect from a peripheral edge of the bottom panel, the case including a space formed by the bottom panel and the case peripheral wall; and
a cover provided with a cover panel and a cover peripheral wall standing erect from the peripheral edge of the cover panel, the cover panel being assembled into the case in a state in which the cover panel covers the space in the case and at least a part of an inner surface of the cover peripheral wall and an outer surface of the case peripheral wall are facing one another, thereby forming a housing space along with the case and housing the circuit structure within the housing space;
wherein the electrical apparatus includes:
a bottom panel-side region at a position close to the bottom panel, at least a part of the outer surface of the case peripheral wall and at least a part of the inner surface of the cover peripheral wall facing one another along an entire periphery of the bottom panel-side region;
a cover panel-side region at a position closer to the cover panel than the bottom panel-side region, at least a part of the outer surface of the case peripheral wall and at least a part of the inner surface of the cover peripheral wall substantially abutting each other along an entire periphery of the cover panel-side region; and
a middle region between the bottom panel-side region and the cover panel-side region;
wherein in the middle region, a groove is formed in at least one of (i) the entire periphery of the outer surface of the case peripheral wall or (ii) the entire periphery of the inner surface of the cover peripheral wall; and
a facing distance between the outer surface of the case peripheral wall and the inner surface of the cover peripheral wall facing each other in the bottom panel-side region is larger than a facing distance between the outer surface of the case peripheral wall and the inner surface of the cover peripheral wall in the cover panel-side region, and is smaller than a facing distance between the outer surface of the case peripheral wall and the inner surface of the cover peripheral wall in the middle region.

2. The electrical apparatus according to claim 1, wherein the groove is formed in the outer surface of the case peripheral wall.

3. The electrical apparatus according to claim 1, wherein in the bottom panel-side region, the direction in which a gap between the inner surface of the cover peripheral wall and the outer surface of the case peripheral wall faces is a horizontal direction or downward in the direction of gravity.

4. The electrical apparatus according to claim 1, wherein:
the case has a shape in which the outer periphery corners of the bottom panel are chamfered and includes a case-side inclined surface; and
the case-side inclined surface is formed along the entire periphery of a corner formed by the bottom panel and the case peripheral wall.

5. The electrical apparatus according to claim 1, wherein:
the tip edge of the cover peripheral wall has an enlarging shape in which the opening becomes larger when moving away from the cover panel, and the inner surface thereof has a cover-side inclined surface that slopes to the outside when moving away from the cover panel; and
the cover-side inclined surface is formed along the entire periphery of the cover peripheral wall.

6. The electrical apparatus according to claim 1, wherein the tip edge of the cover peripheral wall has a protrusion that protrudes beyond the outer surface of the bottom panel of the case.

7. An electrical apparatus system, comprising a plurality of the electrical apparatuses according to claim 2, wherein:
   each of the covers of the plurality of electrical apparatuses has a mounting portion for mounting the cover on the body of a vehicle, and the mounting portions are provided in positions that mutually differ from each other; and
   the different types of covers can be selectively mounted in the case.

* * * * *